United States Patent
Moon et al.

(10) Patent No.: US 8,663,738 B2
(45) Date of Patent: Mar. 4, 2014

(54) ARMATURE FOR FUEL PUMP AND MANUFACTURING METHOD THEREOF

(75) Inventors: Kisang Moon, Daejeon (KR); Seonghwan Moon, Daejeon (KR)

(73) Assignee: Coavis, Chungcheongnam-do (KR)

( * ) Notice: Subject to any disclaimer, the term of this patent is extended or adjusted under 35 U.S.C. 154(b) by 387 days.

(21) Appl. No.: 13/024,026

(22) Filed: Feb. 9, 2011

(65) Prior Publication Data
US 2011/0194958 A1   Aug. 11, 2011

(30) Foreign Application Priority Data
Feb. 10, 2010   (KR) .................. 10-2010-0012321

(51) Int. Cl.
*F04D 13/06*   (2006.01)
*F04D 29/00*   (2006.01)

(52) U.S. Cl.
USPC .......... 427/282; 427/58; 427/256; 427/248.1; 427/255.6; 417/355; 417/356; 310/10; 310/40 R; 310/219; 310/231; 310/233; 310/234

(58) Field of Classification Search
None
See application file for complete search history.

(56) References Cited

U.S. PATENT DOCUMENTS

2007/0262668 A1* 11/2007 Brisson et al. .............. 310/90.5
2007/0278893 A1* 12/2007 Moroto et al. ................ 310/237
2010/0145423 A1*  6/2010 Seifert ......................... 607/116

FOREIGN PATENT DOCUMENTS

JP          3736472 B2      1/2006
KR       1019960034462 A    10/1996
WO    WO 2009151492 A2 * 12/2009 ............. H05K 3/28

* cited by examiner

Primary Examiner — Michael Cleveland
Assistant Examiner — Lisha Jiang
(74) Attorney, Agent, or Firm — The Webb Law Firm

(57) ABSTRACT

Disclosed herein are an armature for fuel pumps and a manufacturing method thereof, in which a polymer coating film is formed on an armature core such that the armature has corrosion resistance to an alcohol fuel and to a highly corrosive fuel.

4 Claims, 5 Drawing Sheets

ARMATURE FOR FUEL PUMP AND MANUFACTURING METHOD THEREOF

BACKGROUND OF THE INVENTION

1. Field of the Invention

The present invention relates to an armature for fuel pumps and a manufacturing method thereof, and more particularly to an armature for fuel pumps and a manufacturing method thereof, in which a polymer coating film is formed on an armature core such that the armature has corrosion resistance to an alcohol fuel and to a highly corrosive fuel.

2. Description of the Prior Art

Fuels for automobiles are generally based on petroleum, but petroleum resources are influenced directly by oil shocks caused by a rapid increase resulting from resource exhaustion and external factors. Thus, in recent years, studies on the development of alternative fuels for automobiles have been continued.

Particularly, as environmental concerns increase, considering alternative fuels as a method for reducing exhaust gas emissions increases as well.

Among alternative fuels for automobiles there is alcohol fuel which is composed of a mixture of ethanol or methanol with gasoline.

The alcohol fuel is advantageous in that it can increase the output of automobiles due to the high heat efficiency of alcohol and can significantly reduce exhaust gas emissions compared to the use of petroleum. Also, due to the exhaustion of fossil fuels, the use of the alcohol fuel is expected to increase further.

Meanwhile, in systems such as automotive gasoline engines or diesel engines which are driven by liquid fuels, a fuel tank for storing the fuel is provided. In the fuel tank, a fuel pump module for forcedly supplying the fuel stored in the fuel tank to the engine is provided.

The fuel pump module includes a fuel pump for transferring the fuel into the engine, and a motor including an armature is provided therein.

The armature comprises a central shaft, a core which is stacked on the central shaft and serves to form an electric field, a commutator which is disposed at one end of the core while coming into contact with a brush and serves to supply an electric current and a protective portion for protecting the core. An impeller is connected to the central shaft and is rotated by a repulsive force between the magnetic fields of permanent magnets disposed outside the armature, thereby transferring the fuel.

The core is generally formed of steel, and when an alcohol fuel is used as an automobile fuel, there is a problem in that the core corrodes faster than when a typical fuel (based on petroleum) is used.

In an attempt to prevent this problem, a method of plating the core of the armature with nickel or tin has been proposed. However, the method has problems in that surface washing should necessarily be carried out in order to increase the adhesion of the nickel or tin plating and in that the nickel or tin used can be introduced into the core gap to cause internal corrosion.

Also, in order to prevent the washing solution from flowing into the core gap, a gap blocking process should be carried out before the surface washing process, resulting in an increase in the production cost.

For these reasons, it is required to develop an armature which has corrosion resistance to an alcohol fuel and, at the same time, can be easily produced.

SUMMARY OF THE INVENTION

Accordingly, the present invention has been made in view of the problems occurring in the prior art, and it is an object of the present invention to provide an armature for fuel pumps and a manufacturing method thereof, in which a polymer coating film is formed on an armature core such that the armature has increased corrosion resistance to an alcohol fuel and to a highly corrosive fuel.

According to one aspect of the present invention, there is provided a method for manufacturing an armature for fuel pumps, the method comprising the steps of: assembling a central shaft, a core which is stacked on the central shaft and serves to form an electric field, a commutator which is disposed at one end of the core while coming into contact with a brush and serves to supply an electric current, and a protective portion for protecting the core; pretreating the assembled structure with an adhesion promoter; masking a region excluding a coating film-formed region including the core; forming a coating film on the armature after carrying out the masking step; and removing the masking after carrying out the coating step.

In the method of the present invention, the coating film is preferably formed by chemical vapor deposition (CVD) of parylene (poly-para-xylylene).

Also, the masking step comprises: masking the central shaft using a shrinkable tube or a jig; masking the commutator and the protective portion using a tape; and masking a region adjacent to the coating region or a curved region.

Moreover, the method of the present invention further comprises, before forming the coating film, performing an assistant pretreatment.

The assistant pretreatment is carried out by vacuum deposition.

According to another aspect of the present invention, there is provided an armature for fuel pumps manufactured according to the above-described method.

BRIEF DESCRIPTION OF THE DRAWINGS

The above and other objects, features and advantages of the present invention will be more clearly understood from the following detailed description taken in conjunction with the accompanying drawing, in which.

DESCRIPTION OF MAIN REFERENCE NUMERALS USED IN THE DRAWINGS

S10 to S60: steps of a method for manufacturing a fuel pump armature according to the present invention;
1: fuel pump module; 10: flange assembly;
20: reservoir body assembly; 21: reservoir body;
22: in-tank filter; 23: fuel pump;
30: guide rod; 40: connection hose;
100: fuel pump armature
110: central shaft; 120: core;

130: commutator; 140: protective portion;
210: housing;
221: case; 222: cover;
223: impeller; 224: bearing;
225: communication line; 226: inlet opening;
227: connection; 228: terminal;
229: outlet opening; 230: permanent magnet.

DETAILED DESCRIPTION OF THE INVENTION

Hereinafter, a method for manufacturing an armature for fuel pumps according to the present invention will be described in detail with reference to the accompanying drawings.

Figure 1:
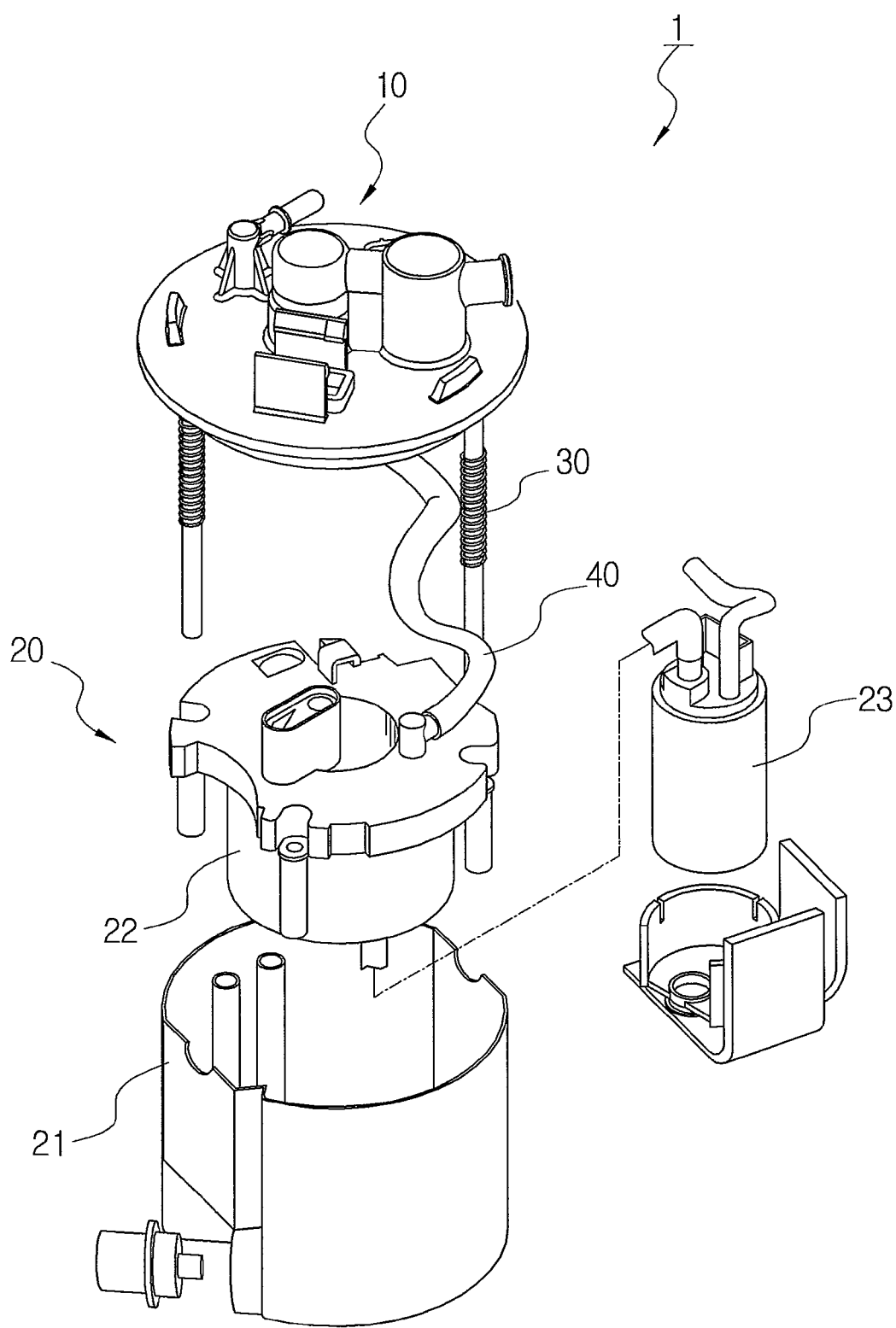
FIG. 1 is a disassembled perspective view of a fuel pump module.
Figure 2:
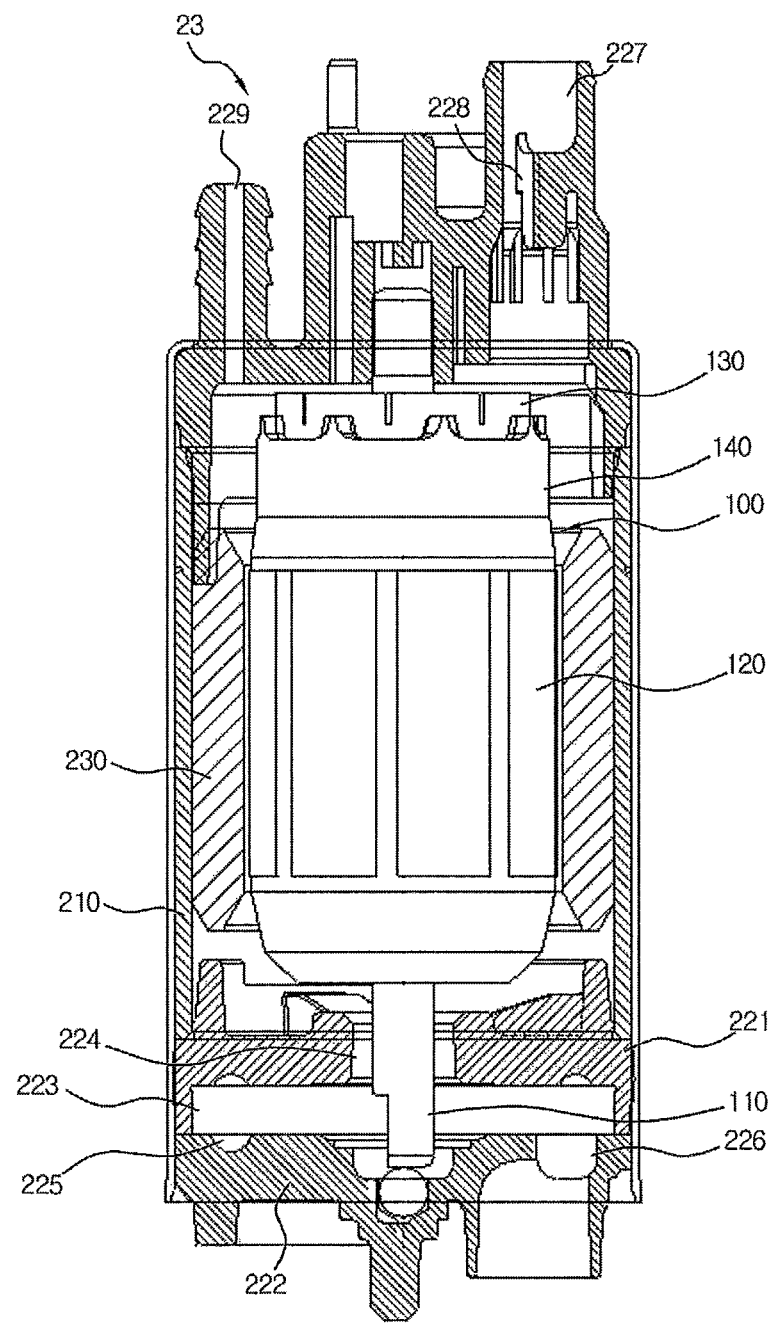
FIG. 2 is a cross-sectional view of a fuel pump.
Figure 3:
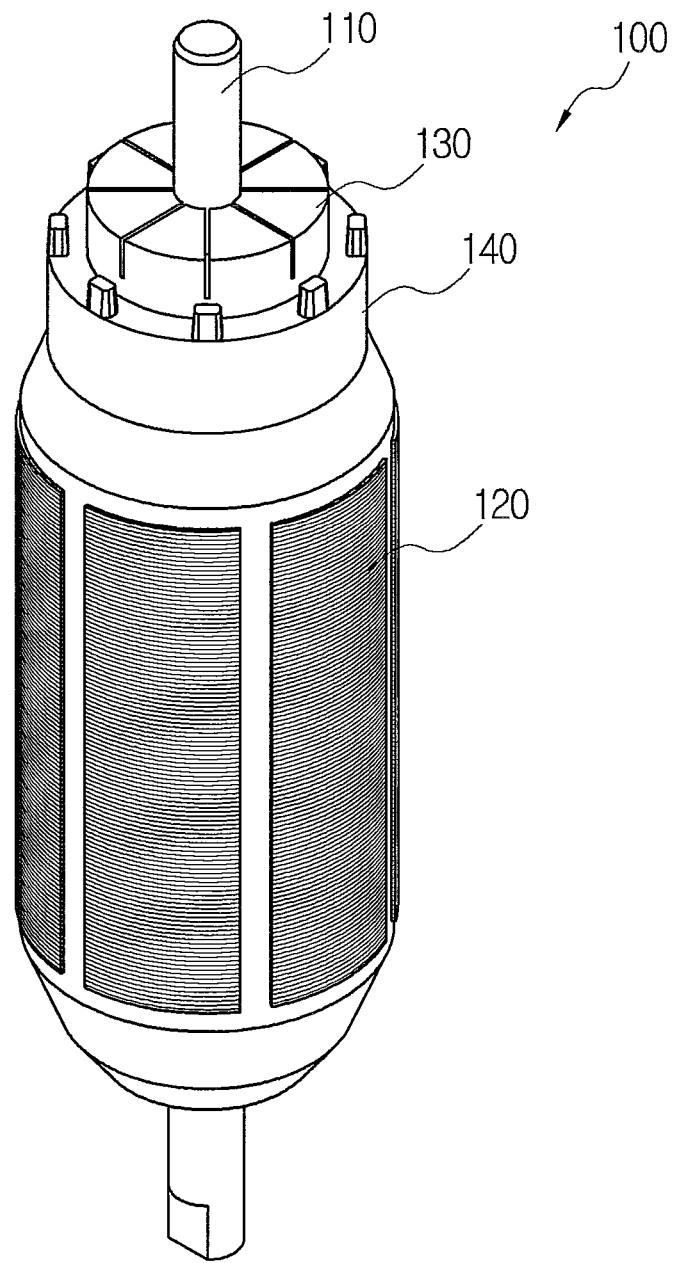
FIG. 3 is a perspective view showing an armature for fuel pumps according to the present invention.
Figure 4:
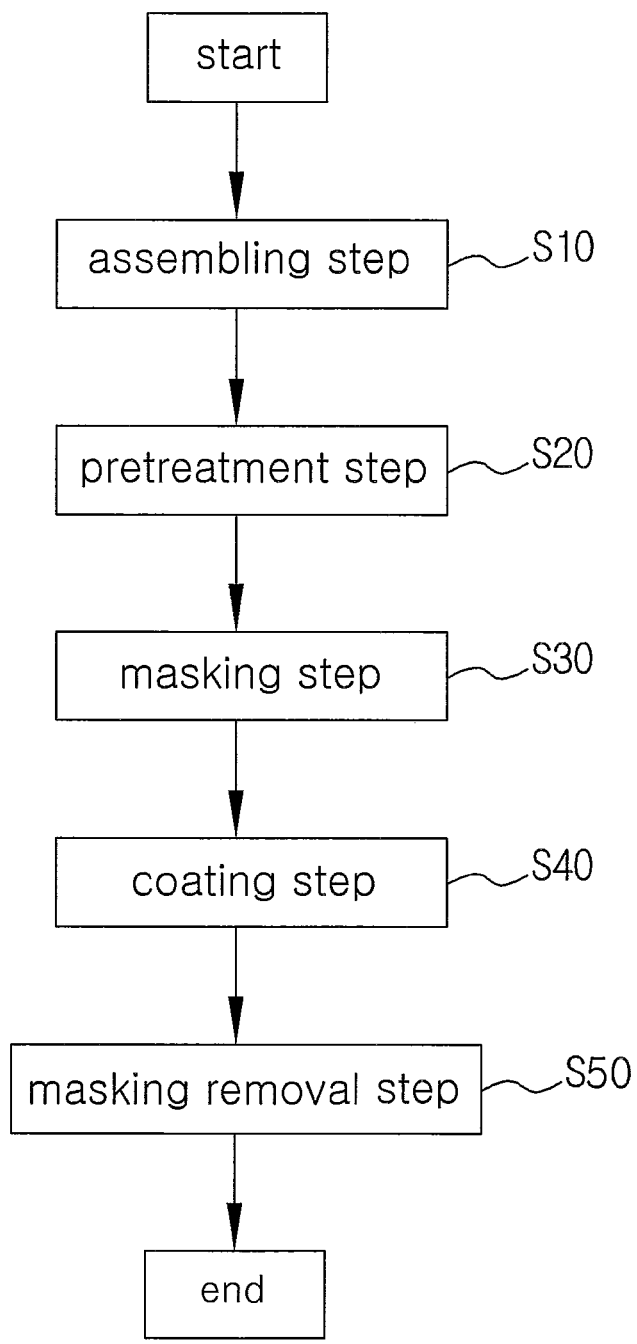
FIG. 4 is a flow chart showing a method for manufacturing an armature for fuel pumps according to the present invention.
Figure 5:
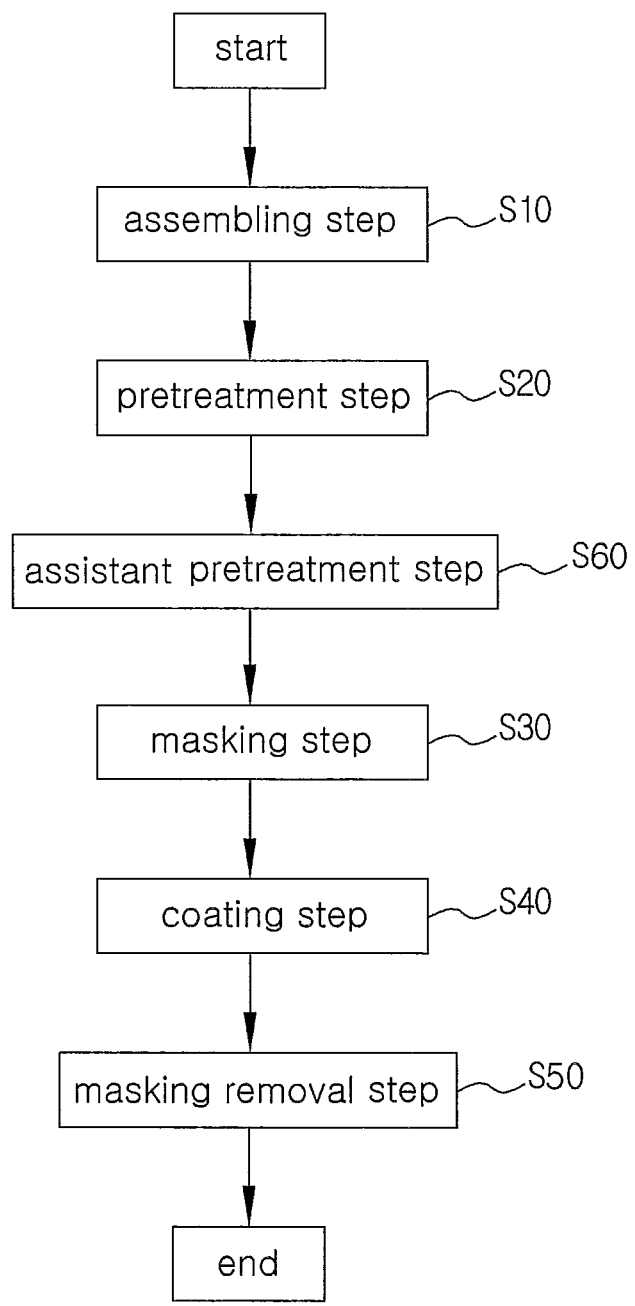
FIG. 5 is another flow chart showing a method for manufacturing an armature for fuel pumps according to the present invention.

FIG. 1 is a disassembled perspective view of a fuel pump module 1; FIG. 2 is a cross-sectional view of a fuel pump 23; FIG. 3 is a perspective view showing an armature 100 for fuel pumps according to the present invention; FIG. 4 is a flow chart showing a method for manufacturing an armature 100 for fuel pumps according to the present invention; and FIG. 4 is another flow chart showing a method for manufacturing an armature 100 for fuel pumps according to the present invention.

The present invention relates to the fuel pump armature 100 and a manufacturing method thereof, wherein the armature is provided in the fuel pump 23 of the fuel pump module 1.

The fuel pump module 1 is configured to forcedly supply a fuel stored in a fuel tank to an engine and comprises a flange assembly 10 fixed to the fuel tank, and a reservoir body assembly 20 connected to the lower side of the flange assembly 10 by a guide rod 30 (see FIG. 1).

The reservoir body assembly 20 may comprise: a reservoir body 21; a fuel pump 23 placed in the reservoir body 21 to transfer the fuel to the engine; and an in-tank filter 22 provided in the reservoir body 21 to filter the fuel, wherein the upper side of the in-tank filter 22 is connected with the flange assembly 10 by a connection hose 40 so as to transfer the fuel to the engine.

As shown in FIG. 2, the fuel pump 23 comprises: a housing 210 having a plurality of permanent magnets 230 disposed on the inner circumferential surface; a fuel pump armature 100 provided in the housing 210; a case 221 which is placed under the housing 210 and in which the central shaft 110 of the fuel pump armature 100 is inserted and also in which a communication line 225 for transferring the fuel is formed; a cover 222 for closing the case 221, in which a fuel inlet opening 226 is formed; an impeller 223 which is placed between the case 221 and the cover 222 and is rotated by the rotation of the fuel pump armature 100; a terminal 228 which can be connected to a battery (not shown) and a brush (not shown) such that an electric current is supplied to a commutator 130; and a fuel outlet opening 229 for discharging the fuel introduced into the housing 210.

Between the central shaft 110 and the case 221, a bearing 224 that facilitates the rotation of the central shaft 110 of the fuel pump armature 100 may further be provided.

Also, as the impeller 223 is rotated by the rotation of the fuel cell armature 100, the fuel is introduced into the housing 210 through the inlet opening 226 and the communication line 225 and discharged through the outlet opening 229.

Namely, the fuel pump armature 100 comes into direct contact with the fuel and must not be corroded by the fuel.

Hereinafter, the method for manufacturing the fuel pump armature 100 according to the present invention will be described in further detail with reference to FIG. 4.

In the inventive method for manufacturing the fuel pump armature 100 which is provided in the housing 210 of the fuel pump 23, the armature 100 is formed to comprise the central shaft 110, the core 120, the commutator 130 and the protective portion 140, wherein a coating film is formed on a specific portion including the core 120.

More specifically, the inventive method for manufacturing the fuel pump armature 100 comprises: an assembling step (S10); a pretreatment step (S20); a masking step (S30); and a coating step (S40).

First, the assembling step (S10) is a step of assembling the central shaft 110, the core 120, the commutator 130 and the protective portion 140.

The central shaft 110 is a fundamental body having the core 120, the commutator 130 and the protective portion 140. The impeller 223 is connected to one end of the central shaft 110.

The core 120 is a region stacked on the central shaft 110 and serves to form an electric field. It is composed of a stack of a plurality of sheets.

The commutator 130 is provided at one side of the core 120 (the upper side of the core in the drawing) and is configured to supply an electric current while coming into contact with the brush.

The protective portion 140 is an injection-molded part serving to protect the core 120.

As described above, the assembling step (S10) is a step of assembling the central shift 110, the core 120, the commutator 130 and the protective portion 140.

The pretreatment step (S20) is a step of pretreating the assembled structure using an adhesion promoter such that the adhesion between the elements of the assembled structure during the subsequent coating step (S40) is further improved.

Specifically, the pretreatment step (S20) is a process in which the reactivity of the surface of the assembled structure with a coating is increased using the adhesion promoter.

More specifically, the adhesion promoter that is used in the pretreatment step (S20) is preferably a silane coupling agent selected from the group consisting of vinyl triethoxysilane, aminopropyl triethoxysilane, mercaptopropyl trimthoxysilane, or methacryloxypropyl trimethoxysilane.

Particularly, in the pretreatment step (S20) of the method for manufacturing the fuel pump armature 100 according to the present invention, the use of the adhesion promoter requires a silanizing molecule (organic functional silane). For this purpose, methacryloxypropyl trimethoxysilane may be used as the silane coupling agent to increase the adhesion between inorganic and organic polymers.

The masking step (S30) is a step of masking a region excluding a coating film-formed region including the core 120.

As used herein, the term "coating film-formed region" refers to a region including the portion of the core 120 that is exposed to the outside and the region of the protective portion 140 that is adjacent to the core 120, wherein the region of the protective portion 140 includes a minimum region in which the coating film for preventing the corrosion of the core 120 can be formed.

Because the configuration of the assembled and pretreated fuel pump armature 100 includes a curved portion, the masking step (S30) may comprise a first masking step (S31) to a third masking step (S33).

The first masking step (S31) is a step of masking the central shaft 110 using a shrinkable tube or a jig.

The second masking step (S32) is a step of masking the commutator 130 and the protective region 140 by taping a region in which the commutator 130 and the protective region 140 are formed, using a tape.

The tape that is used in the second masking step (S32) is preferably a tape that does not leave residue and has good adhesion so as not to come off.

The third masking step (S33) is a step in which a curved region or the boundary between the regions formed in the first masking step (S31) and the second masking step (S32) is masked with an adhesive.

Also, in the third masking step (S33), the portion adjacent to the coating region is masked with an adhesive so as to prevent a decrease in the adhesion of the tape attached to the portion adjacent to the coating region.

The inventive method for manufacturing the fuel pump armature 100 has advantages in that the armature 100 can be formed in a simple manner by carrying out the first (S31) to third masking step (S33) and in that the coating film can be easily prevented from being formed in regions other than the coating region.

The coating step (S40) is a step of forming a coating film on the armature 100 which has been subjected to the masking step (S30), in which the coating film can be formed by chemical vapor deposition (CVD) of parylene (poly-para-xylene).

Parylene is a corrosion-resistant material, and the inventive method of manufacturing the fuel pump armature 100 by forming the coating film using parylene has advantages in that it is easy for the parylene to fill the gap of the core 120 so as to prevent corrosion caused by external agents and in that, even if corrosion caused by the penetration of an alcohol fuel into the armature progresses to the surface of the armature, the rate of progression of the corrosion can be significantly reduced.

Also, the parylene has advantages in that, because it does not cause fine pin holes and bubbles, it can be easily deposited and can effectively prevent the corrosion of the armature surface.

The masking removal step (S50) is a step of removing the masking after carrying out the coating step (S40).

Also, in the inventive method for manufacturing the fuel pump armature 100, an assistant pretreatment step (S60) may further be carried out before the coating step (S40) so as to further increase the adhesion of the coating film in the coating step (S40).

The fuel pump armature 100 of the present invention is characterized in that it is manufactured by the above-described method.

The fuel pump armature 100 of the present invention has an advantage in that the corrosion resistance of the armature 100 to an alcohol fuel can be effectively improved by a simple process.

As described above, according to the inventive method for manufacturing the fuel pump armature, the fuel pump armature having corrosion resistance to an alcohol fuel can be manufactured by forming the polymer coating film on the core. Also, the inventive manufacturing method is a simple method and can further improve production efficiency.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for manufacturing an armature for fuel pumps, the method comprising the steps of:
   assembling a central shaft, a core which is stacked on the central shaft and serves to form an electric field, a commutator which is disposed at one end of the core while coming into contact with a brush and serves to supply an electric current, and a protective portion for protecting the core;
   pretreating the assembled structure with an adhesion promoter;
   masking a region excluding a region on which a coating film is to be formed, wherein said region on which the coating film is to be formed includes the core;
   forming the coating film on the armature after carrying out the masking step; and
   removing the masking after carrying out the coating step;
   wherein the masking step comprises:
      first masking the central shaft using a shrinkable tube or a jig;
      second masking the commutator and the protective portion using a tape; and
      third masking a region adjacent to the region on which the coating film is to be formed or a curved region of the armature that is located between the first mask and the second mask using an adhesive so as to prevent the tape from coming off.

2. The method of claim 1, wherein the coating film is formed by chemical vapor deposition (CVD) of parylene (poly-para-xylylene).

3. The method of claim 1, wherein the method further comprises, before forming the coating film, performing an assistant pretreatment.

4. The method of claim 3, wherein the assistant pretreatment is carried out by vacuum deposition.

* * * * *